United States Patent [19]

Gribble

[11] Patent Number: 5,337,702
[45] Date of Patent: Aug. 16, 1994

[54] FIELD DOG TRAINING DEVICE AND METHOD

[76] Inventor: Robert J. Gribble, 26442-164 SE., Kent, Wash. 98042

[21] Appl. No.: 23,326
[22] Filed: Feb. 25, 1993
[51] Int. Cl.⁵ .............................................. A01K 15/00
[52] U.S. Cl. ........................................................ 119/786
[58] Field of Search .................. 119/29, 96, 109, 120, 119/121, 122; 482/74, 55; 273/55 R

[56] References Cited

U.S. PATENT DOCUMENTS

| | | | |
|---|---|---|---|
| 2,790,419 | 4/1957 | Sullivan | 119/121 |
| 3,189,003 | 6/1965 | Canfield | 119/120 |
| 3,203,399 | 8/1965 | Banks | 119/120 |
| 3,244,149 | 4/1966 | Bosko et al. | 119/29 |
| 3,583,322 | 6/1971 | Vykutal | 119/96 X |
| 4,182,272 | 1/1980 | Taff | 119/29 |
| 4,606,430 | 8/1986 | Roby et al. | 119/96 X |
| 4,791,886 | 12/1988 | Anderson | 119/120 |
| 4,862,833 | 9/1989 | Brotz | 119/120 |

*Primary Examiner*—Gene Mancene
*Assistant Examiner*—Thomas Price
*Attorney, Agent, or Firm*—Dean A. Craine

[57] ABSTRACT

A device and method for training a field dog is described herein. The device which is designed to be lightweight and portable, includes an elongated bar member with a plate attached at one end having a plurality of spikes extending downward therefrom. During use, the plate is positioned so that the spikes may be forcible driven into the ground to securely attached the device in the ground. A vertically aligned hook structure is attached to the top surface at approximately the mid-point of the elongated bar member which, during use, engages a rope disposed between the dog and the trainer. When the rope is placed across the top surface of the elongated bar member and moved forward, the hook structure engages the rope and becomes a fulcrum point between the dog and the trainer. An optional pulling handle may be attached to the top surface of the elongated bar member so that the device may be easily removed from the ground. Using the device, a method of training a field dog, such as a pointer or retriever, is also disclosed.

15 Claims, 4 Drawing Sheets

FIELD DOG TRAINING DEVICE AND METHOD

BACKGROUND OF THE INVENTION

1. Field of the Invention

This invention relates to devices and methods used to train dogs, and more particularly, to devices and methods used to train field dogs.

2. Description of the Related Art

There are thirty-nine breeds of field dogs which are divided into three main categories—pointing breeds; retrieving breeds; and flushing breeds. During the last two hundred years, each breed in the three categories have been selectively bred to strengthened certain desirable instincts. One such instinct is the instinct to point birds. One objective for all dog trainers is to teach the dog to "sit", to "stay", to "heel", and to "come" on command. For a field dog trainer, a further objective is to strengthen the dog's instinct to point, to fetch, and to flush prey on command. Since all field dogs have the instinct to chase prey, one goal of a field dog trainer is to modify this instinct for the specific category of field dog. For example, most untrained field dogs want to instinctively chase the prey as it is flushed from the field. To prevent the dog from being accidentally shot or from scaring other prey hiding in the field, the trainer must modify the dog's behavior so that it remains stationary until the "fetch" command is given.

In order to properly train the field dog, the trainer must not only give commands but also be able to effectively control the dog at all times. For example when training pointers, the trainer must stand in front of the dog and "work the bird" while maintaining verbal and physical control of the dog. To keep the dog in a stationary, pointing position, a second individual, hereinafter known as a helper, is used to restrain the dog using a rope attached to the dog's collar. When the bird is "put to wing" by the trainer, the helper restrains the dog in a position known as "steady to wing". When the bird is grounded, the helper continues to restrain the dog in a position known as "steady to shot". When the bird is finally shot and falls to the ground, the trainer then gives the "fetch" command and the helper releases the dog so that it may retrieve the bird.

When training pointers, the dog must be taught to stand and hold a point until a "fetch" command is given by the trainer. Unfortunately with current training methods, teaching the dog to hold a point is difficult. In many instances, when the dog is restrained with rope attached to its collar, the dog will jump and spin around trying to free itself. As a result, the dog will often loose its mark on the bird.

When training retrievers and pointers, it is desirable to teach the dog to stay in a sitting or pointing position at various distances from the trainer. To teach these skills, various modes of rewards and punishment must be used. When one individual is attempting to train the dog using current training methods, the punishment can be harsh and detrimental causing the dog to cower, lose style, or intentional ignore the bird after smelling it to avoid pressure, also known as "blinking the bird".

Because current methods used for training field dogs are inefficient and require the trainer to use a helper, the cost of training field dogs is increased. Also, because helpers are not always available for training, one individual using current training methods to train a field dog, may produce a dog that is improperly or partially trained.

A device and method which is easy to use and which allows one individual to completely and properly train a field dog would be very desirable.

SUMMARY OF THE INVENTION

It is an object of the present invention to provide a device used for training field dogs, such as pointing breeds, retriever breeds, and flushing breeds.

It is another object of the present invention to provide such a device which enables one individual to properly train a field dog.

It is further object of the present invention to provide a safe and effective method for training a field dog.

According to the present invention, the foregoing and other objects are attained by a device designed for training field dogs. Because of the unique skills that must be taught to field dogs, a safe, more effective method of training such dogs using the device is also provided. In general, the device allows one individual to train a field dog by substituting the normally required helper with the device.

The device is portable and lightweight and is capable of being used in most terrains. The device includes a rigid elongated bar member having a ground engaging means attached at one end thereof which enables the device to be selectively attached to the ground. In one embodiment, the ground engaging means includes a flat plate with a plurality of downward, forward slanting spikes attached to the bottom surface thereof. During set up, the elongated bar member is disposed horizontally on the ground so that the spikes may be forcibly driven into the ground to prevent the device from moving in a forward, horizontal direction. In addition, the spikes prevent the elongated bar member from being lifted upward from the ground by the pulling forces exerted on the rope engaging means by either the dog or the trainer. The spikes also prevent the elongated bar member from being rotated laterally so that the elongated bar member's longitudinal axis is always aligned in a forward direction during use.

Attached to the top surface of the elongated bar member is a rope engaging means capable of slidingly engaging a rope. During use, the elongated bar member is disposed on the ground laterally and slightly behind the dog with the rope placed across the top surface of the elongated bar member. When the rope is moved forward over the top surface of the elongated bar member, it engages the rope engaging means that projects upward from the top surface of the elongated bar member. When either end of the rope is pulled forward by either the dog or the trainer, the rope engaging means acts as a fulcrum point to transfer the force exerted thereon towards the opposite end of the rope. This allows the trainer to stand in front of the dog and pull the end of the rope to apply rearward pressure on the dog. The rope engaging means is also designed so that when the trainer releases one end of the rope, the rope may be pulled freely therethrough to allow the dog to break towards the prey. The rope engaging means is attached at a location on the elongated bar member so that the upward vector force exerted by the rope thereon is approximately equal to the downward forces exerted by the elongated bar member and the ground engaging means. The rope engaging means also acts as an attachment means for attaching the device to the trainer's belt or pocket during transport. An optional pulling handle may be attached to the elongated bar member above the flat plate which enables the trainer to easily pull the elongated bar member upward to remove the device from the ground.

Although the device may be used for training all dogs, it has been found especially useful in training field dogs. Using the device in combination with a rope connected to the dog's waist with a half-hitch tie, one individual may easily train the dog thereby eliminating the harsh punishment typically used with current training methods. By attaching a half-hitch tie around the dog's waist, safe and uncomfortable pressure is be applied to the dog's waist. Because the pressure is uncomfortable, the dog learns over a relatively short time not to fight or pull against the rope.

DESCRIPTION OF THE PREFERRED EMBODIMENT(S)

The present description of the device 18 is directed to its use in training field dogs, generally referred as 12, such as retrievers 12' and pointers 12". It should be understood that such stated use is for the sake of understanding, and is not intended to be a limitation since the device 18 may be used for training other types of dogs or other animals.

Figure 1:
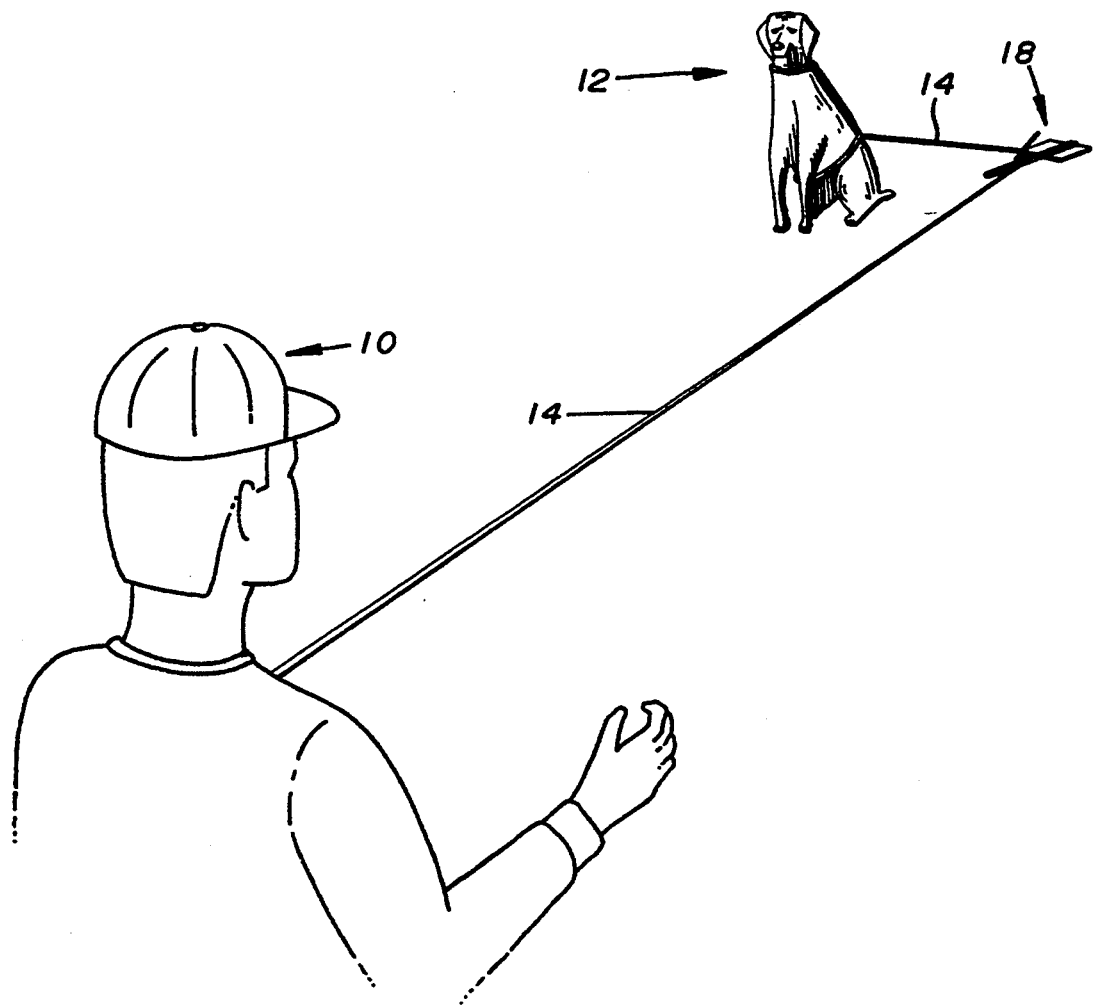
FIG. 1 is a perspective view of a trainer using the device to train a dog.
Figure 2:
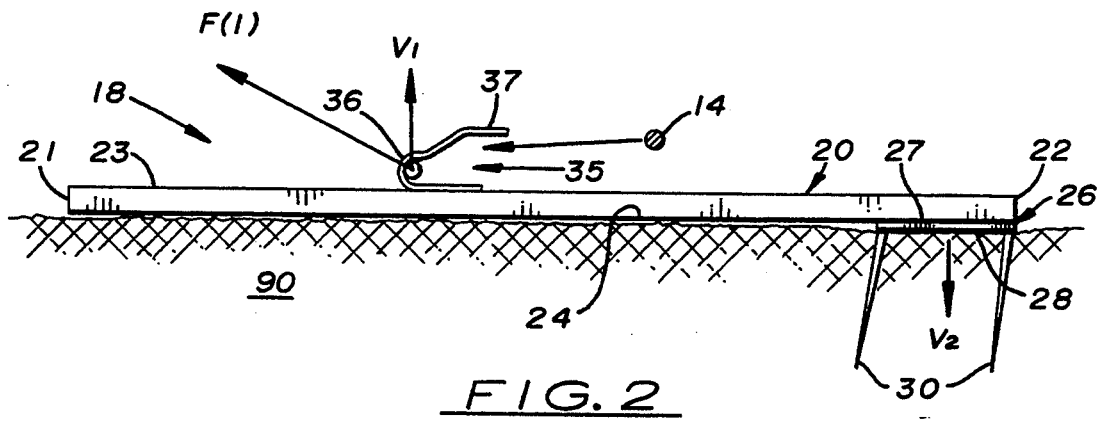
FIG. 2 is a side elevational view of the device.
Figure 3:
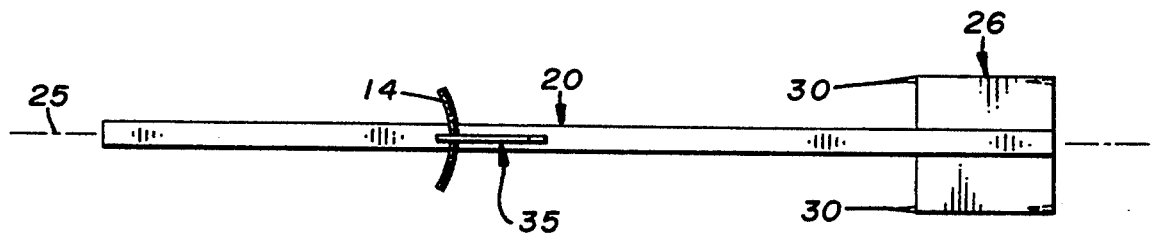
FIG. 3 is a top plan view of the device shown in FIG. 2.

As shown in FIGS. 2, 3, the device 18 comprises a rigid elongated bar member 20 having a first end 21, a second end 22, a flat top surface 23, a flat bottom surface 24, and a longitudinal axis 25. In the preferred embodiment, the elongated bar member 20 is made of square, 1×1 inch steel or aluminum tubing material capable of withstanding the forces exerted by a dog and trainer. The elongated bar member 20 is also designed to withstand the trainer's weight if the trainer stands thereon. In the embodiment shown, the elongated bar member 20 is approximately 28 inches in length.

Figure 4:
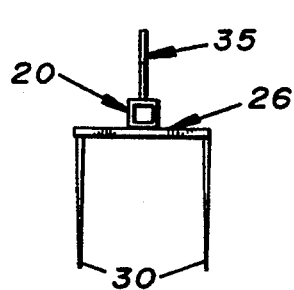
FIG. 4 is a front elevational view of the device shown in FIGS. 2 and 3.

Attached near the second end 22 of the elongated bar member 20 is a ground engaging means which enables the device 18 to be selectively attached in a horizontal position on the ground 90. In the embodiment shown in FIGS. 2-4, the ground engaging means includes a plurality of downward projecting, forward slanting spikes 30 aligned in a parallel manner and attached to the bottom surface 28 of the plate 26. During manufacturing, the top surface 27 of the plate 26 is welded (shown) or bolted to the bottom surface 24 of the elongated bar member 20. In the embodiment shown, the plate 26 is square measuring approximately 4"×4"×⅛" (L×W×H) and made of steel or aluminum plate material. It should be understood, that plate 26, may be manufactured from other material and in other shapes and sizes.

Figure 5:
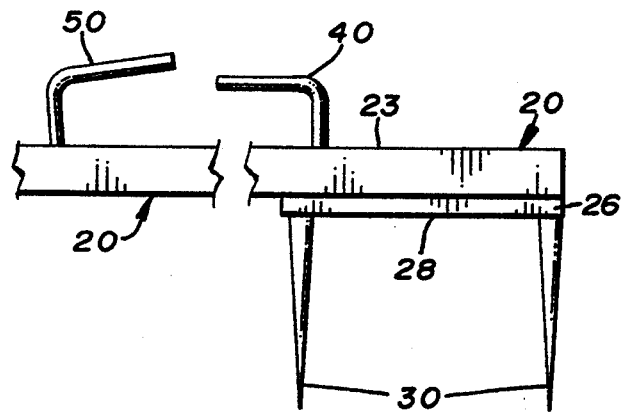
FIG. 5 is a side elevational view of another embodiment of the invention showing a alternative hook structure and a handle attached to the elongated bar member.

In the preferred embodiment, one spike 30 is attached to each corner of the plate 26. Each spike 30, which is welded or threadingly attached to the plate 26, is approximately 4" in length and approximately ⅜" in diameter. In the preferred embodiment, the spikes 30 are aligned in a parallel manner and extend downward and forward towards the first end 21 approximately 15 degrees from the vertical axis. By disposing the spikes 30 at such an angle, greater ground holding action is achieved which prevents undesirable forward and lateral movement of the device 18 during use. FIG. 5 shows an alternative embodiment of the invention with the spikes 30 aligned in a vertical, downward projecting position from the plate 26.

Attached at approximately the mid-point of the elongated bar member 20 is a rope engaging means capable of slidingly engaging a traversing rope 14 connected at one end to the dog 12 and held at the opposite end by the trainer 10. As shown in FIG. 2, the rope engaging means is attached at a position on the elongated bar member 20 so that the upward vector component force V(1) exerted by the pulling force F(1) exerted on the rope 14 by either the dog or trainer is approximately equal to the downward vector force component V(2) exerted by the ground engaging means on the ground and the weight of the device 18.

In the embodiment shown, the rope engaging means comprises a vertically aligned, upward projecting hook structure 35 capable of slidingly engaging a traversing, forward advancing rope 14. Hook structure 35, which is made of approximately ⅜ inch round bar material, is attached to the elongated bar member 20 approximately 10 inches from the first end 21. The hook structure 35 has a rearward facing lower arcuate region 36 capable of receiving the rope 14 as it moves forward over the elongated bar member 20. In the preferred embodiment, the hook structure 35 also has an optional rearward extending upper section 37 which is integrally attached to the arcuate region 36. The upper section extends upward approximately 2½ inches above the top surface 23 of the elongated bar member 20 and is designed to direct a slightly elevated forward advancing rope 14 into the arcuate region 36 of the hook structure 35. The upper section 37 thereby allows the trainer 10 to easily engage the rope 14 in the hook structure 35 from a distance by simply moving the rope 14 forward over the elongated bar member 20.

Figure 6:
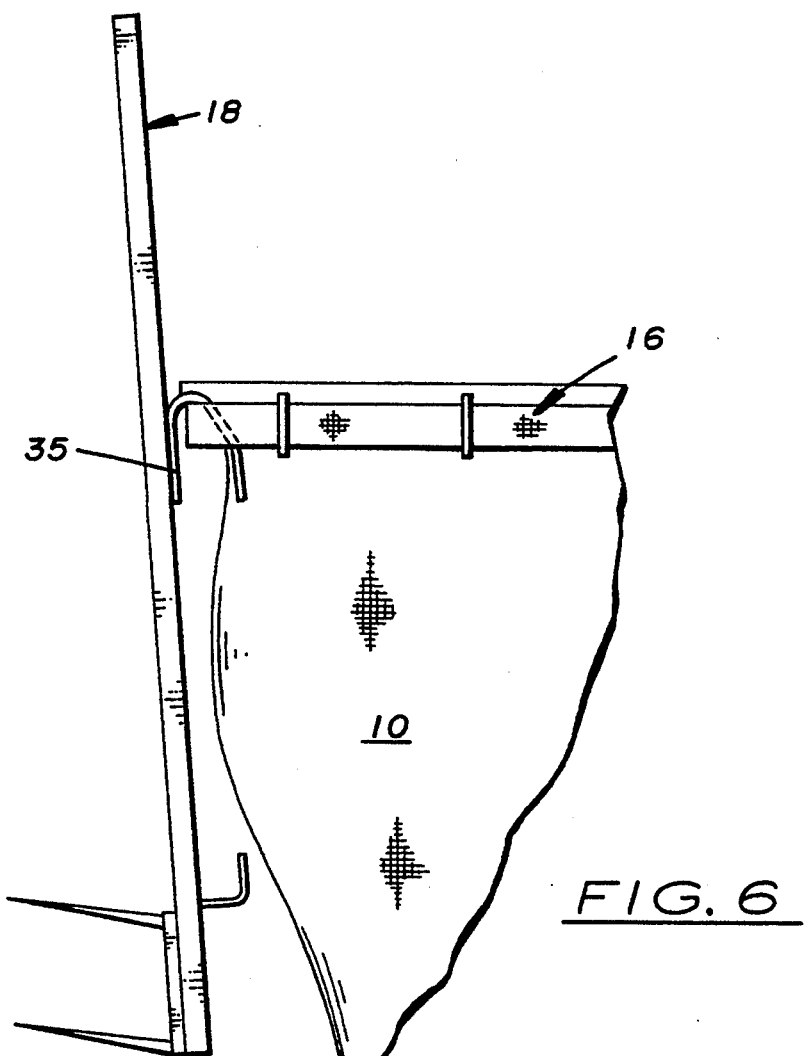
FIG. 6 shows the device attached to the trainer's belt for easy transport.

The lower arcuate region 36 of the hook structure 35 is also designed so that when the trainer releases one end of the rope 14, it may be pulled freely therethrough to allow the dog 12 to break towards the prey. The upper section 37 of the hook structure 35 is also sufficiently elevated above the elongated bar member 20 and extends sufficiently rearward so that it can also serve as a carrying handle for easily transport by the trainer 10. As shown in FIG. 6, for example, the device 18 aligned and transported in a vertical position by attaching the hook structure 35 to the trainer's belt 16 or pocket.

FIG. 5 shows an alternative rope engaging means comprising an angled hook structure 50 attached to the elongated bar member 20. Also shown is an optional pulling handle 40 attached to the top surface 23 of the elongated bar member 20 just above the plate 26 which allows the trainer to pull the elongated bar member 20 upward to remove the device 18 from the ground.

In summary, the main advantage of the invention over other training devices or methods found in the prior art is that the device 18 eliminates the need for a helper normally required to train field dogs. Another advantage of the invention is that the device 18 enables the trainer to maintain control and give commands to the dog 12 while standing near or at a distance and in a forward or lateral position. Further advantage of the invention is that it allows one individual to train the dog without using harsh modes of punishment commonly used today with current training methods.

Figure 7:
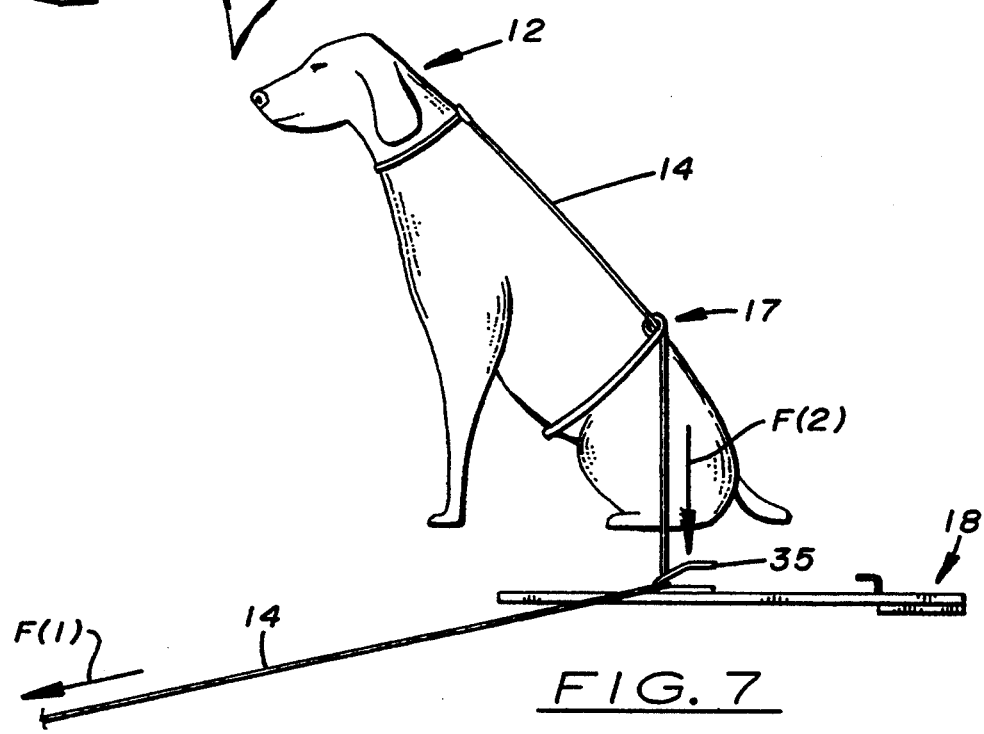
FIG. 7 is a side elevation view of a retriever restrained in a sitting position using the device.
Figure 8:
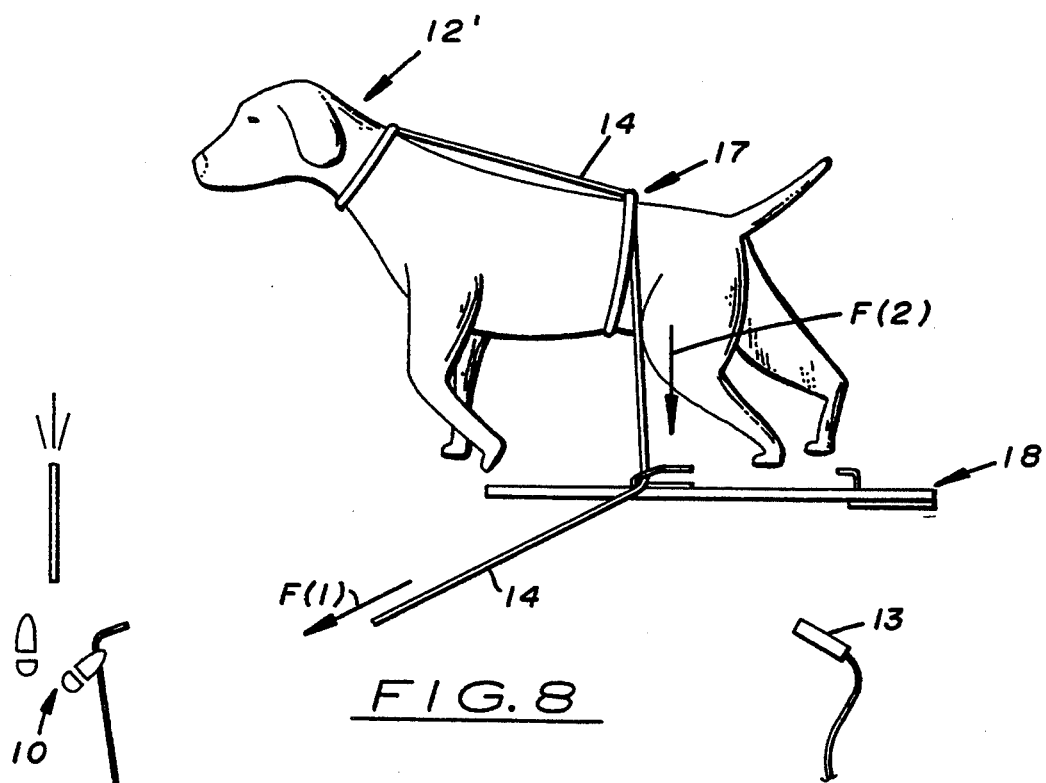
FIG. 8 is a side elevation view of a pointer restrained in a standing position using the device.
Figure 9:
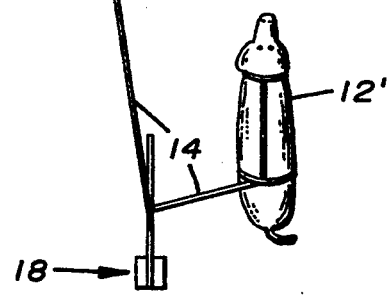
FIG. 9 is a top plan view showing the relative positions of the trainer, device and pointer during training.
Figure 10:
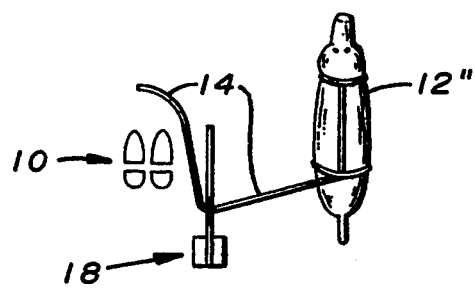
FIG. 10 is a top plan view showing the relative positions of the trainer, device and retriever during training.

As shown in FIGS. 1–3, and 7, 8, the device 18 is used by placing the elongated bar member 20 horizontally on the ground 90 with the spikes 30 pointing downward. The device 18 is aligned on the ground so that the first end 21 of the elongated bar member 20 and the longitudinal axis 25 are pointing forward towards the field. After aligning the device 18, the trainer then stomps on the plate 26 with one foot to forcibly drive the spikes 30 into the ground 90. Next, the trainer attaches one end of the rope 14 to the dog's collar and positions the dog 12 laterally and slightly in front of the device approximately 1 to 3 feet. The length of rope 14 used with the device 18 will vary depending upon the skill being taught. For example, if the dog is being trained as a retriever and being taught to "sit" and "fetch" a thrown dummy 13 as shown in FIGS. 7 and 9, the trainer 10 may stand on one side of the device 18 with a rope 14 being relatively short, i.e. 8 to 10 feet in length. If instead the dog is being trained as a pointer 12″ and being taught to stand in a pointing position as shown in FIGS. 8 and 10, the trainer 10 will stand in a forward position 10 to 15 feet in front of the dog 12″. In this instance, the rope 14 must be approximately 25 feet in length.

As shown in FIGS. 7, 8, during training the rope 14 is extended down the back of the dog and tied around the dog's waist using a half-hitch tie 17 which automatically tightens around the dog's waist when the rope 14 is pulled. The inventor has found use of the half-hitch tie 17 around the dog's waist is the preferred means to control the dog than attaching the rope to the dog's collar since it allows the trainer to more effectively control the dog. As mentioned above, uncomfortable pressure is applied to the dog's waist which the dog soon learns to avoid by remaining in a pointing or sitting position. Since this uncomfortable pressure is relatively effective, no additional verbal or physical punishment is required from the trainer 10.

After the trainer 10 has secured the rope 14 around the dog's waist, he then extends the rope 14 downward and laterally 14 to engage the rope 14 in the hook structure 35 located on the device 18. Once the rope 14 is engaged in the hook structure 35, the trainer moves to the opposite side of the device 18 and pulls the rope 14 to remove any slack therein. While holding the free end of the rope 14 and pulling slightly, the trainer 10 is able to control the dog 12 while standing either adjacent to the device 18 or in a forward position relative to the dog 12.

When training all field dogs, the first commands to be taught are the "sit" and "stay" commands. By positioning the hook structure 35 directly below and behind the dog's waist, when the trainer pulls on the rope 14, a lateral force F(1) is exerted on the hook structure 35. Hook structure 35 then directs the lateral force F(1) into a downward force F(2) which is applied to the dog's waist to restrain it in a standing or sitting position. By using various different lengths of rope, the trainer is able to control the dog while standing or performing acts, such as "working the bird", in front of the dog.

During training, it is sometimes desirable to move the device 18 to different locations in the field. By using the pulling handle 40 to pull the plate 26 upward, the device 18 may be quickly and easily removed from the ground.

Using the device 18 and a half-hitch tie 17, a novel method for training field dogs is provided. The method for training a field dog includes the following steps:

a. securing a dog training device 18 in the ground, the dog training device 18 includes an elongated bar member 20 having a ground engaging means and a rope engaging means, the ground engaging means enabling the device 18 to be secured to the ground 90, the rope engaging means enabling a rope 14 to be sliding engaged to the device 18, b. positioning a dog 12 to be trained as a field dog in a position lateral and forward to the rope engaging means on the device 18;

c. attaching one end of the rope 14 to the dog's collar;

d. forming a half hitch tie 17 around the waist of the dog 12;

e. disposing the rope 14 transversely over the top surface 23 of the bar member 20 and engaging the rope 14 with the rope engaging means on the device 18;

f. holding the opposite end of the rope 14 and positioning oneself a desired distance from the device, and;

g. pulling the opposite end of the rope 14 so that the dog 12 is restrained in a sitting or standing position;

In compliance with the statute, the invention has been described in language more or less specific as to structural features. It should be understood, however, that the invention is not limited to the specific features shown since the means and construction shown comprises the preferred forms of putting the invention into effect. For example, the rigid bar could be made in different lengths and cross-sectional shapes. The height and dimensions of the hook structure and its point of attachment could be adjusted for different uses. Also, the size and shaped of the plate could be altered.

The invention is, therefore, claimed in any of its forms or modifications within the legitimate and valid scope of the amended claims, appropriately interpreted in accordance with the doctrine of equivalents.

I claim:

1. A dog training device, comprising:
   a. a rigid, elongated bar member, said bar member having a first end, a second end, a top surface, a bottom surface, and a longitudinal axis;
   b. A ground engaging means attached to said bar member near said second end, said ground engaging means capable of selectively attaching said device to the ground;
   c. A rope engaging means capable of engaging a transversing, forward moving rope disposed over said top surface of said bar member, said rope engaging means being attached at a fixed position on said bar member so that when said rope engages said rope engaging means the upward force is exerted thereon is approximately equal to the downward force exerted by said ground engaging means on said ground thereby preventing movement of said device.

2. A dog training device, as recited in claim 1, wherein said ground engaging means includes a plate and a plurality of ground engaging spikes, said plate being attached to said bar member near said second end, said spikes being attached to and projecting downward from said plate, said spikes capable of being forcibly driven in the ground to hold said device thereto.

3. A dog training device, as recited in claim 2, wherein said spikes are forward slanting and aligned in a parallel manner from the bottom surface of said plate.

4. A dog training device, as recited in claim 2, wherein said rope engaging means is a vertically aligned, hook structure.

5. A dog training device, as recited in claim 4, wherein said hook structure has a rearward facing lower arcuate region and a rearward extending upper diagonally aligned section.

6. A dog training device, as recited in claim 5, further comprising a pulling handle attached to said bar. member enabling said bar member to be removed from said ground.

7. A dog training device, as recited in claim 5, wherein said bar member is made of tube material approximately 1 inch square in cross section.

8. A dog training device, as recited in claim 7, wherein said plate is approximately (4×4) inches.

9. A dog training device, as recited in claim 8, wherein said bar member is approximately 28 inches in length.

10. A dog training device, as recited in claim 9, wherein said hook structure is located approximately 10 inches from said first end.

11. A dog training device, comprising:
   a. an elongated bar member, said bar member having a first end, a second end, a top surface, a bottom surface, and a longitudinal axis;
   b. a plate attached to said bar member near said second end, said plate having a bottom surface;
   c. a plurality of spikes structures attached to said bottom surface of said plate, said spike structures capable of being driven into the ground to selectively attach said device thereto, and;
   d. a rearward facing hook structure attached at a fixed position on said top surface of said bar member, said hook structure capable of engaging a forward moving rope transversely disposed across said top surface of said bar member.

12. A dog training device, as recited in claim 11, wherein said spike structures are downward, forward slanting and aligned in a parallel manner from said plate.

13. A dog training device, as recited in claim 12, wherein said hook structure has a rearward facing lower arcuate region and an upper diagonally aligned section.

14. A dog training device, as recited in claim 13, further comprising a handle attached to said bar member enabling said bar member to be removed from said ground.

15. A method of training a field dog comprising the following steps:
   a. securing a dog training device in the ground, said dog training device including an elongated bar member having a ground engaging means and a rope engaging means, said ground engaging means enabling said device to be secured to the ground, said rope engaging means enabling a transversely disposed rope to be slidingly engaged to said device;
   b. positioning a dog to be trained in a position lateral and forward to said rope engaging means on said device;
   c. attaching one end of said rope to said dog;
   d. forming a half hitch tie with said rope around the waist of said dog;
   e. disposing said rope transversely over the top surface of said bar member and engaging said rope with the rope engaging means on said device;
   f. holding the opposite end of said rope and positioning one-self a desired distance from said device, and;
   g. pulling the opposite end of said rope so that said dog 12 is restrained in a sitting or standing position;

* * * * *